United States Patent
Badiru (10) Patent No.: US 10,259,495 B2
(45) Date of Patent: Apr. 16, 2019

(54) SYSTEMS AND METHODS FOR REAL-TIME STEERING RESPONSE COMPENSATION IN VEHICLES

(71) Applicant: GM GLOBAL TECHNOLOGY OPERATIONS LLC, Detroit, MI (US)

(72) Inventor: Ibrahim A. Badiru, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/625,066

(22) Filed: Jun. 16, 2017

(65) Prior Publication Data

US 2018/0362074 A1    Dec. 20, 2018

(51) Int. Cl.
*B62D 3/12*    (2006.01)
*B62D 6/00*    (2006.01)
*B62D 5/04*    (2006.01)

(52) U.S. Cl.
CPC ............. *B62D 6/003* (2013.01); *B62D 5/046* (2013.01); *B62D 5/0421* (2013.01); *B62D 6/001* (2013.01); *B62D 3/12* (2013.01)

(58) Field of Classification Search
CPC ...... B62D 6/003; B62D 5/0421; B62D 5/046; B62D 6/001; B62D 3/12
See application file for complete search history.

(56) References Cited

U.S. PATENT DOCUMENTS

| | | | |
|---|---|---|---|
| 2007/0179735 A1* | 8/2007 | Fiedler | B60R 21/0132 702/150 |
| 2009/0192676 A1* | 7/2009 | Sidlosky | B60T 8/1755 701/41 |
| 2011/0241862 A1* | 10/2011 | Debouk | B60W 50/035 340/439 |
| 2013/0002416 A1* | 1/2013 | Gazit | B62D 1/28 340/438 |
| 2013/0211620 A1* | 8/2013 | Yokota | B60T 8/17551 701/1 |
| 2014/0005871 A1* | 1/2014 | Saito | B60L 5/045 701/22 |
| 2014/0081525 A1* | 3/2014 | Itamoto | B62D 5/0484 701/42 |
| 2016/0185387 A1* | 6/2016 | Kuoch | B60K 35/00 701/41 |
| 2016/0221575 A1* | 8/2016 | Posch | B60W 50/0098 |
| 2016/0236712 A1* | 8/2016 | Shirakata | G08B 21/06 |

(Continued)

*Primary Examiner* — Hussein Elchanti
(74) *Attorney, Agent, or Firm* — Lorenz & Kopf, LLP (57) ABSTRACT

An electronic control unit for a steer-by-wire vehicle steering system includes a data storage component that stores a desired lateral acceleration versus steering angle profile with regard to a range of vehicle speeds and a processor operably and electronically coupled with a steering wheel angle sensor and a yaw sensor. The data storage component includes electronic instructions that causes the processor to receive steering wheel angle data over a range of vehicle speeds, receive vehicle yaw data over the range of vehicle speed correlated to the steering wheel angle data, generate an observed lateral acceleration versus steering angle profile with regard to the range of vehicle speeds, and generate a steering ratio correction based on a comparison of the desired lateral acceleration versus steering angle profile and the observed lateral acceleration versus steering angle profile.

20 Claims, 5 Drawing Sheets

(56) References Cited

U.S. PATENT DOCUMENTS

| | | | |
|---|---|---|---|
| 2016/0280235 A1* | 9/2016 | Sugaiwa | B60W 50/12 |
| 2016/0280236 A1* | 9/2016 | Otsuka | B60W 10/20 |
| 2016/0280254 A1* | 9/2016 | Shimizu | B62D 5/04 |
| 2016/0347327 A1* | 12/2016 | Kondo | B60W 50/14 |
| 2017/0102700 A1* | 4/2017 | Kozak | B60W 30/00 |
| 2017/0106876 A1* | 4/2017 | Gordon | B60W 50/082 |
| 2017/0106903 A1* | 4/2017 | Moretti | B62D 6/00 |
| 2017/0166203 A1* | 6/2017 | Sugai | B60T 8/17 |
| 2017/0269586 A1* | 9/2017 | D'Andrea | H04W 64/00 |
| 2017/0313304 A1* | 11/2017 | Shiraishi | B60W 10/18 |

\* cited by examiner

SYSTEMS AND METHODS FOR REAL-TIME STEERING RESPONSE COMPENSATION IN VEHICLES

The present disclosure generally relates to vehicle steering systems. More particularly, the present disclosure relates to systems and methods for real-time steering response compensation in vehicles.

Steering system connections in a conventional automotive vehicle are typically provided via direct mechanical linkages between a steering device and the front wheels of the vehicle. For example, in a rack and pinion steering system the rotation of a steering wheel rotates a pinion gear that is engaged with mating notches or teeth in a rack portion of the steering system. Tie rods connect the rack portion to the wheels, so that any rotational motion of the steering wheel ultimately rotates the road wheels to a resultant steering angle, which may vary depending on the steering ratio provided by the steering system. Other steering linkage designs may be used instead of a rack and pinion design, such as worm gears used in a re-circulating ball steering system. In either example, however, all control linkages are purely mechanical in nature.

By way of contrast, in a by-wire steering system, an electronically controlled steering actuator is positioned on or in proximity to the front drive axle, and one or more transducers and/or other sensors measure or detect the steering request or input to a steering device, which is usually a circular steering wheel. The sensors can be configured to measure a steering angle at the steering wheel. The electronic input signals representing these measured or detected values are then transmitted electrically to a steering actuator, which executes a steering maneuver in response to the electronic input signals.

In by-wire systems, the steering response characteristic, that is, the steering angle achieved by a given input to the steering wheel, is an initial design parameter in the manufacture of a vehicle that is based, in part, on market segment, customer preferences, and the like. Yet, over time, wear of vehicle chassis components changes the vehicle response character away from its initial design parameters. Accordingly, over time, the driver may feel as if the vehicle is becoming less or more responsive to steering inputs in certain situations.

By-wire systems can be configured to selectively vary a steering ratio to a degree that is determined in part by the speed of the vehicle, in order to optimize the steering response. Accordingly, it would be desirable to provide systems and methods for real-time steering response compensation in vehicles, such that even as vehicle chassis components wear over time, the driver does not realize any appreciable diminution in steering performance and responsiveness. Furthermore, other desirable features and characteristics of the present disclosure will become apparent from the subsequent detailed description and the appended claims, taken in conjunction with the accompanying drawings and this introductory section.

BRIEF SUMMARY

In one embodiment, an electronic control unit for a steer-by-wire vehicle steering system includes a data storage component that stores a desired lateral acceleration versus driver steering angle profile with regard to a range of vehicle speeds and a processor operably and electronically coupled with a steering wheel angle sensor and a yaw sensor. The data storage component includes electronic instructions that causes the processor to receive steering wheel angle data over a range of vehicle speeds, receive vehicle yaw data over the range of vehicle speed correlated to the steering wheel angle data, generate an observed lateral acceleration versus driver steering angle profile with regard to the range of vehicle speeds, and generate a steering ratio correction based on a comparison of the desired lateral acceleration versus steering angle profile and the observed lateral acceleration versus steering angle profile.

In variations, the processor receives the steering wheel angle data from a steering wheel sensor or a rotary sensor operably coupled with the electronic control unit. The processor receives vehicle yaw data from an inertial measurement unit operably coupled with the electronic control unit. The processor is configured to generate the steering ratio correction in a feedforward manner. The processor is configured to generate the steering ratio correction based on steering data segment analysis, wherein the data segment analysis is performed on an observed data segment over a predefined period of time. The processor determines whether the observed data segment comprises data recorded at an average vehicle speed of less than a predefined average vehicle speed. The processor determines whether the observed data segment comprises data recorded within am absolute speed range of less than a predefined absolute vehicle speed range. The processor determines whether the observed data segment comprises data having a standard deviation of less than a predetermined standard deviation range. The processor is further configured to apply a high-pass filter to the observed data segment. The processor is further configured to correlate the observed yaw data and lateral acceleration profile. The processor is further configured to calculate a homogeneity of the correlated observed yaw data and lateral acceleration profile. The processor is further configured to calculate a lateral acceleration of the vehicle during the segment based on the yaw data and the range of vehicle speeds. The processor is further configured to determine if a mean lateral acceleration of the vehicle during the segment is less than a predefined normal operating lateral acceleration. Only data that meets all of the described operating condition criteria are used for further data analysis.

In another embodiment, a method for operating an electronic control unit of a steer-by-wire vehicle steering system includes the (processor operated) steps of receiving steering wheel angle data over a range of vehicle speeds, receiving vehicle yaw data over the range of vehicle speed correlated to the steering wheel angle data, generating an observed lateral acceleration versus steering angle profile with regard to the range of vehicle speeds, and generating a steering ratio correction based on a comparison of the desired lateral acceleration versus steering angle profile and the observed lateral acceleration profile.

In yet another embodiment, a vehicle includes a plurality of wheels and a steer-by-wire steering system operably coupled with the plurality of wheels. The steer-by-wire system includes an electronic control unit. The electronic control unit includes a data storage component that stores a desired lateral acceleration versus steering angle profile with regard to a range of vehicle speeds and a processor operably and electronically coupled with a steering wheel angle sensor and a yaw sensor. The data storage component includes electronic instructions that causes the processor to receive steering wheel angle data over a range of vehicle speeds, receive vehicle yaw data over the range of vehicle speed correlated to the steering wheel angle data, generate an observed lateral acceleration versus steering angle profile with regard to the range of vehicle speeds, and generate a steering ratio correction based on a comparison of the desired lateral acceleration versus steering angle profile and the observed lateral acceleration profile.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed steering response compensation systems and methods. Furthermore, there is no intention to be bound by any theory presented in the preceding introductory section or the following detailed description.

Systems and methods are disclosed herein in connection with a vehicle that includes a by-wire steering system. The by-wire steering systems includes an electronic control unit, which includes an open loop algorithm that automatically detects and continuously compensates for vehicle steering response characteristic changes that may be created by tire wear, suspension/steering component wear, vehicle load conditions, etc. The algorithm is used to populate a feedforward steering control table. The feedforward control table is then used to adjust the effective steering ratio to compensative for any characteristic changes in the steering response.

Figure 1:
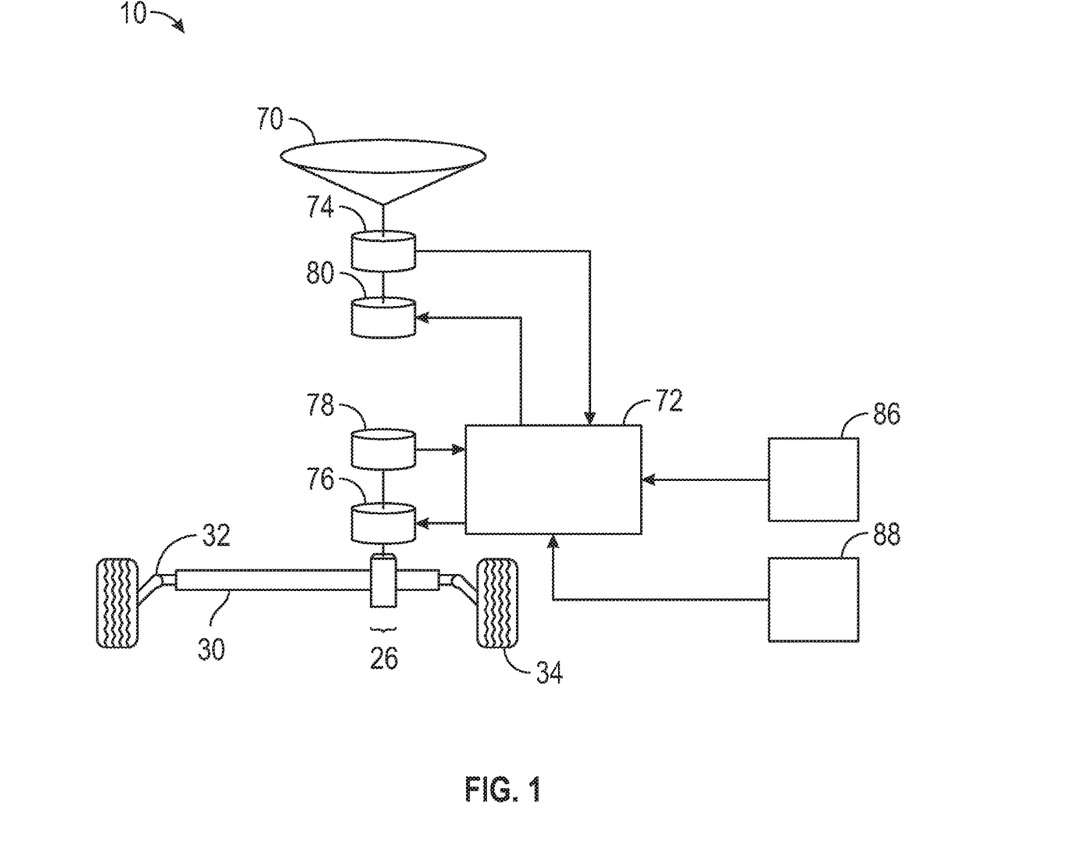
FIG. 1 is a system diagram of a steer-by-wire vehicle steering system in accordance with embodiments of the present disclosure.

FIG. 1 illustrates a by-wire steering system 10 in accordance with embodiments of the present disclosure. An exemplary vehicle includes steering system 10, which includes steering wheel 70. Steering wheel sensors 74 detect the movement of the steering wheel 70 and transmit that command to a steer-by-wire electronic control unit (ECU) 72, which then delivers the command to the steering motor 76 which controls a rack and pinion 26. Wheel sensors 78 deliver signals regarding wheels 34 movement to the steer-by-wire ECU 72, which delivers these signals to the feedback motor 80 which then moves the steering wheel 70 to provide feedback to the driver (similarly to the feedback provided by the wheels in a manual steering vehicle). Tie rods 32 connect a rack 30 to the wheels 34 and convert the movement of the rack 30 into rotation of the wheels 34.

The vehicle may be configured to measure a yaw component of vehicle movement. The yaw component may be used to calculate an estimated vehicle lateral acceleration. For example, a vehicle travelling straight ahead (or directly in reverse) experiences no yaw, or lateral acceleration ($A_y$). Conversely, if the vehicle initiates a turn while moving forward (or in reverse), the vehicle occupants will feel a slight pull to the left or right, as the vehicle turn to the left or right, respectively. The lateral acceleration force is transmitted from the vehicle's tires to the travelling surface. Lateral acceleration may be measured with respect to gravitational acceleration. For example, a lateral acceleration that is one tenth the acceleration of gravity would be noted as a lateral acceleration of 0.1 g. The yaw component may be measured in the vehicle using an appropriate inertial measurement unit (IMU) 86. The IMU 86 may be operatively coupled to the ECU 72, either via direct electronic connection, or via connection through another computing or processing system of the vehicle. The ECU 72 uses the yaw measurement in the methods and systems of the present disclosure.

The vehicle may be configured to measure a steering wheel angle (SWA). The SWA is the rotational angle that the steering wheel deviates, either left or right, from an unturned position. The unturned position of the steering wheel corresponds with a wheel straight forward driving configuration, wherein the vehicle travels straight forward or backward. A driver of the vehicle may cause the steering wheel to deviate from the unturned position, for example in order to cause the vehicle to turn. Thus, the driver of the vehicle may induce a SWA. SWA may be measured by an appropriate rotary sensor 88 coupled with the steering column of the vehicle. The rotary sensor 88 may be operatively coupled to the ECU 72, either via direct electronic connection, or via a connection through another computing or processing system of the vehicle. In some embodiments, instead of a separate rotary sensor 88, SWA may be measured by steering wheel sensor 74. The ECU 72 uses the SWA measurement in the methods and systems of the present disclosure.

As noted above, the ECU 72 receives a signal based on a sensed movement of the steering wheel 70, and in turn, provides a command to the steering motor 76 on the basis of the signal. The amount of output commanded to the steering motor 76 from the ECU 72 is set at an initial condition during the vehicle design and manufacturing process, for a given amount of steering wheel turn (angle). However, as noted above, due to chassis wear and other factors, in order to maintain the same vehicle turning "feel," it may be desirable to modify the amount of output commanded to the steering motor 76 from the ECU 72 based on given steering wheel movement. For this purpose, embodiments of the present disclosure may employ a feedforward control scheme at the ECU 72. Feedforward is a term describing an element or pathway within a control system that passes a controlling signal from a source in its external environment, often a command signal from an external operator, to a load elsewhere in its external environment. A control system which has only feed-forward behavior responds to its control signal in a pre-defined way without responding to how the load reacts in real-time; it is in contrast with a system that also has feedback, which adjusts the output in real-time to take account of how it affects the load, and how the load itself may vary unpredictably; the load is considered to belong to the external environment of the system. In a feed-forward system, the control variable adjustment is not error-based. Instead it is based on knowledge about the process in the form of a mathematical model of the process and knowledge about or measurements of the process disturbances. Thus, with feed-forward control, the disturbances are measured and accounted for before they have time to affect the system.

Figure 2:
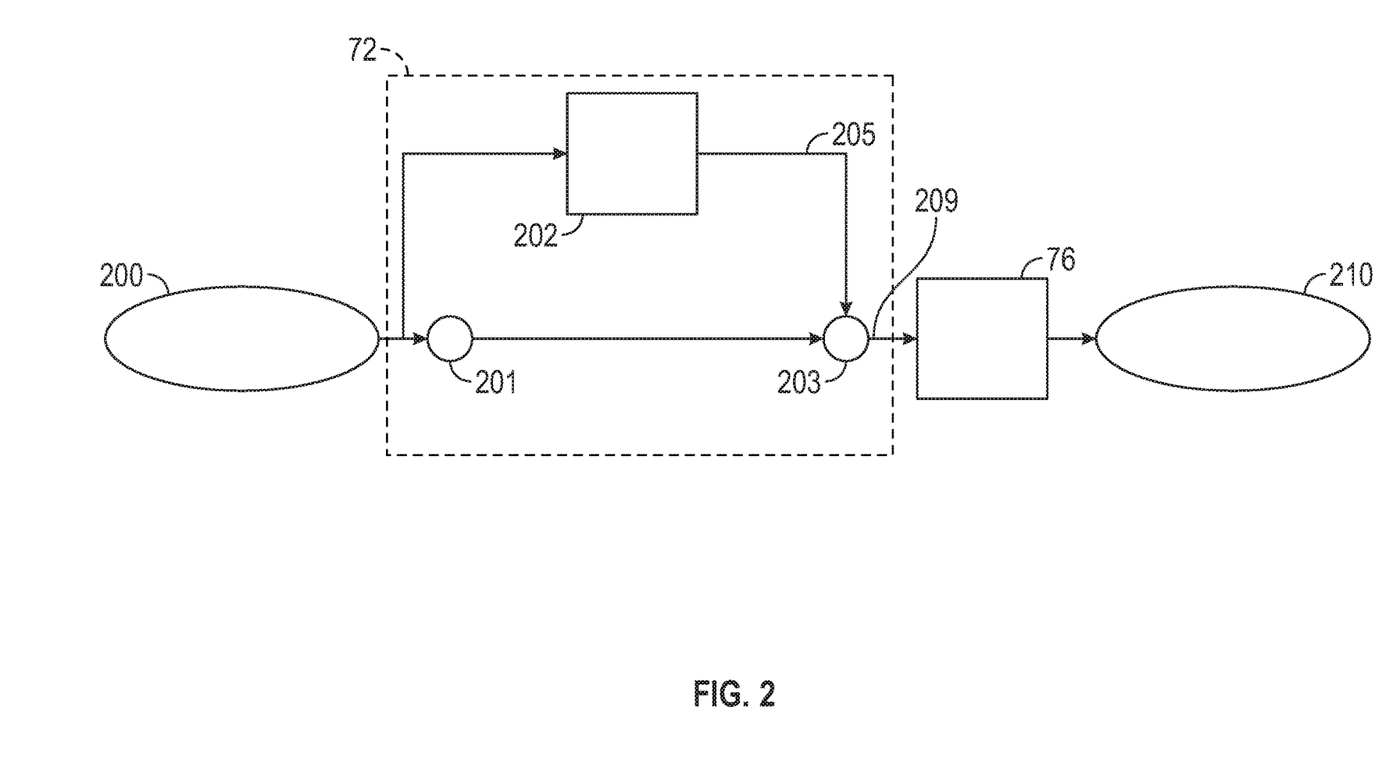
FIG. 2 is a system diagram of a feedforward control system suitable for use in connection with the steer-by-wire vehicle steering system of FIG. 1.

FIG. 2 is a system diagram of a feedforward control system suitable for use at the ECU 72. As previously noted, the driver of a vehicle inputs a change in SWA in order to change a direction of travel of the vehicle. Based on the vehicle's design parameters, for a given speed at which the vehicle is traveling, this change in SWA correlates with a desired lateral acceleration ($A_y$) 200. Steering wheel sensor 74 may transmit this desired acceleration information 200 to the ECU 72. The desired lateral acceleration 200 may be received into the ECU and correlated with an initial output to the steering motor 76 at block 201. In a new condition, without any chassis wear, etc., the initial output 201 would correspond directly with the desired lateral acceleration 200. With a change in these conditions over time, however, this will no longer remain the case. Accordingly, the desired lateral acceleration 200 is also received at a feedforward controller 202 of the ECU 72, which may include a feedforward control table of data. The feedforward control table is populated with data regarding measured and target steering responses at given speeds for given SWAs. The feedforward control table is populated with this data using an algorithm and based on the previously described yaw measurements from the IMU 86 and the rotary sensor 88 (and/or the steering wheel sensor 74), as will be discussed in greater detail below in connection with FIGS. 3A and 3B. Based on the received desired lateral acceleration 200 and the feedforward control table of data, the feedforward control sends a correction value 205, which when combined at block 203 with the initial output 201 yields a corrected control signal 209 to be sent to the steering motor 76 for changing the wheel angle. Accordingly, this corrected control signal 209 accounts for the wear on the chassis that has occurred over time, such that the actual steering response generated (actual $A_y$ output 210) is the same, per the vehicle's design parameters, as if there was no wear to the chassis. In this manner, the vehicle driver does not experience any diminution in steering response, and the actual output lateral acceleration 210 is as expected (desired).

Figure 3A:
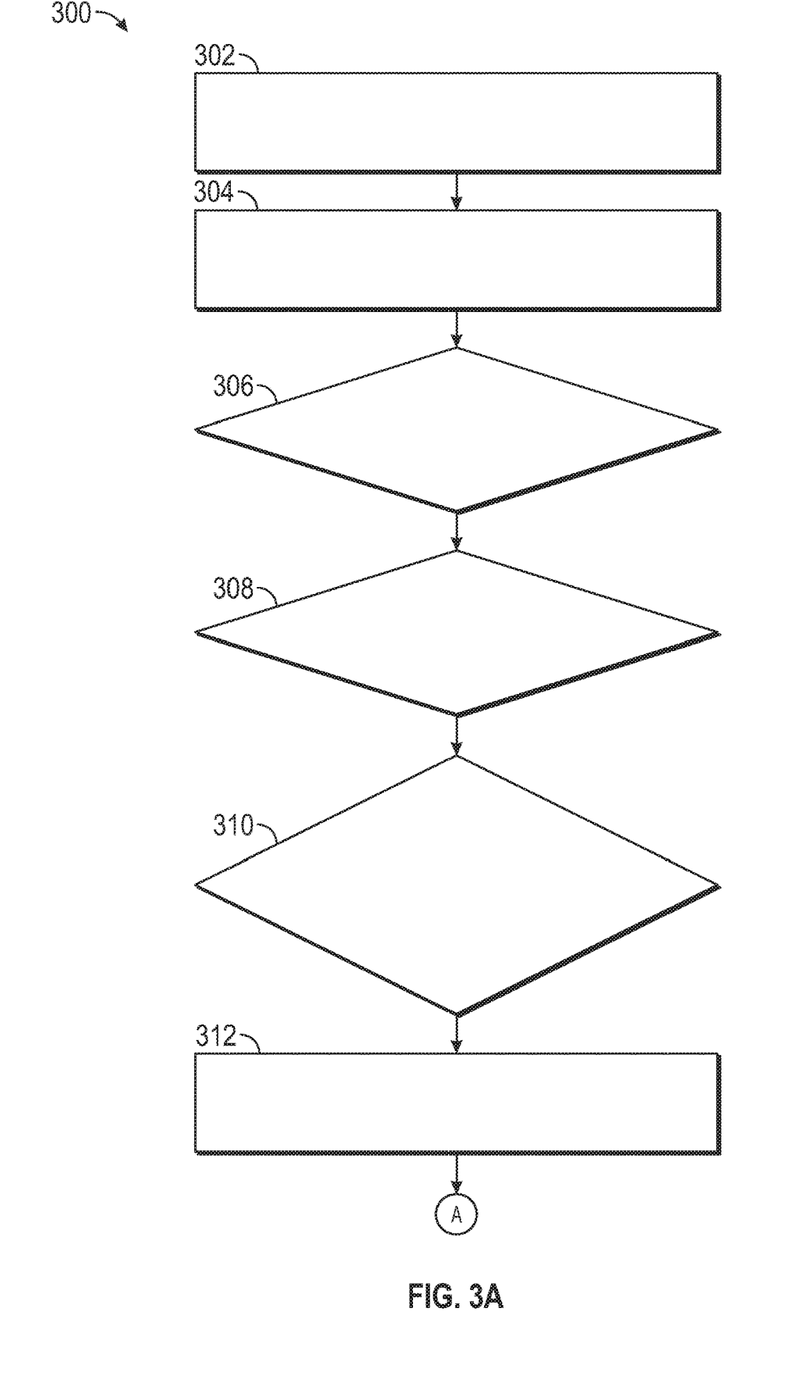
FIGS. 3A and 3B illustrate a flow diagram for generating the feedforward control table for use in connection with the system shown in FIG. 2.
Figure 3B:
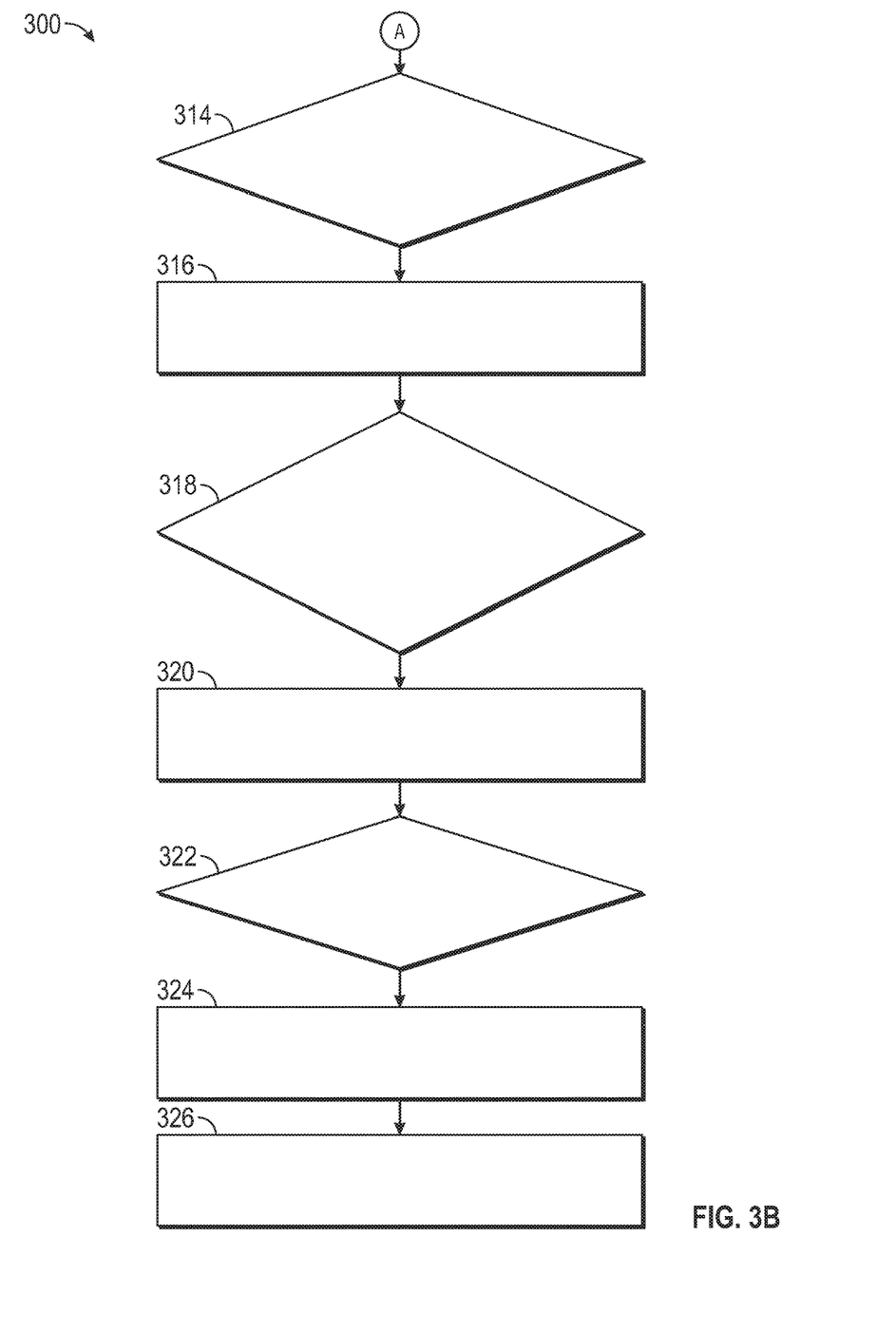

Reference is now made to FIGS. 3A and 3B, which illustrate a flow diagram of a method 300 for generating the feedforward control table mentioned above, and used in connection with the system shown in FIG. 2. As noted above, the vehicle has components that are configured for measuring or calculating SWA, lateral acceleration ($A_y$), and vehicle speed, among other parameters. As such, the method 300 begins at step 302, which includes continuously monitoring received data signals that are representative of these parameters. As noted above, this may be performed with an inertial sensor, a speed sensor, and a SWA sensor. It should be appreciated that road conditions vary, and that from time to time, abnormal steering inputs may be required, based on driving conditions. Thus, in order to generate a reliable data table, the method 300 continues with a step 304 of segmenting the above-noted data signals into 5 second segments, or any other desirable timeframe, segments or "chunks" for analysis, which may be performed by the processor. It should also be appreciated that steering response is only a noticeable quality factor when the vehicle driving speed exceeds a certain value. For example, when a vehicle is maneuvering at low speeds, such as in a parking lot, steering response and lateral accelerations are not appreciable. Thus, in generating the data table, at step 306, it is determined whether the average vehicle speed during the time frame exceeds a certain baseline speed, which may be 100 kph, or any other speed of interest. If not, the data is not considered for inclusion in the table. If so, the method proceeds.

With continued reference to FIGS. 3A and 3B, it should be appreciated that lateral acceleration experienced during a turning maneuver is highly-dependent on the speed at which the vehicle is travelling. That is, for a given change in SWA, the lateral accelerations experienced will be greater a higher vehicle speeds as compared to lower vehicle speeds. Thus, at step 308, in order to ensure the integrity and accuracy of the data in the control table, it should be ensured that the data collected during the segment is such that the vehicle speed has not varied by greater than a given amount, such as 5 kph, or any other value of interest. If not, the data is not considered for inclusion in the table. If so, the method proceeds. Furthermore, another method for ensuring vehicle speed consistency with regard to the measured data is to account for the standard deviation in speed during the measured timeframe. For example, at method step 310, it may be determined whether the standard deviation of speed in the segment is less than a given value, such as 2 kph, or any other value of interest. If not, the data is not considered for inclusion in the table. If so, the method proceeds.

With continued reference to FIGS. 3A and 3B, it should be appreciated that, due to variances in road conditions and the like, the SWA may have a tendency to deviate by small amounts at high frequencies, as compared to a situation where the vehicle is operating over a perfectly flat, smooth surface. Accordingly, at step 312, it is desirable to apply a filter to the measured SWA to account for and remove these high frequency deviations, which do might otherwise distort the correlation between SWA and lateral acceleration. In one particular example, a 1 Hertz Butterworth filter may be employed for this purpose. Other suitable filters known in the art may be employed as well. Accordingly, the original signal is subtracted from the filtered signal for use as the SWA data in the control table. Of course, it should be appreciated that for extremely rough surfaces, even the use of a filter may not provide reliable SWA data. Thus, at method step 314, suitable road smoothness is determined by considering whether the average value of the high-passed filter data is less than a certain amount, such as less than 2 degrees of steering wheel angle movement, or any other value of interest. If not, the data is not considered for inclusion in the table. If so, the method proceeds.

With continued reference to FIGS. 3A and 3B, the obtained yaw data is correlated with the SWA data, at step 316. Data correlation refers to the fact that yaw amount is expected to increase in a predictable (correlatable) amount relative to SWA inputs. If there is substantial variance (i.e., increasing SWA inputs are not correlated with increasing yaw values to an appreciable extent), the data may be considered unreliable. Thus, at step 318, it is determined whether the correlated data is homogeneous, that is, whether the data has a correlation coefficient (r) of greater than a given value, such as greater than 0.90. If not, the data is not considered for inclusion in the table. If so, the method proceeds.

With continued reference to FIGS. 3A and 3B, the lateral acceleration ($A_y$) is calculated based on the obtained data, at step 320. Lateral acceleration is calculated as measured yaw multiplied by vehicle speed. It thus becomes relevant to determine whether the data segment under consideration is derived from what is generally considered as normal driving conditions. Normal driving conditions refer to vehicle operations wherein lateral acceleration values do not exceed a given value, on average. Accordingly, at step 322, the mean $A_y$ is determined over the segment. If this determined mean is less than a value representative of normal driving conditions, then if may be considered that the data was obtained during normal driving conditions. If not, the data is not considered for inclusion in the table. If so, the method proceeds.

The processed data, for the lateral acceleration and the speed, once obtained, may be plotted in the form of an x-y standard graph, at step 324. Based on the foregoing, a steering response variable (SS) may be defined as the lateral acceleration over the degrees of SWA. SS is thus provided in the units of g/deg, where "g" is the standard gravitational acceleration (i.e., the lateral acceleration experienced with as compared to the standard gravitational acceleration) and "deg" is the degrees of SWA movement. Any obtained data may be stored in the control data table, as shown in step 326. As appreciated, lateral acceleration, for any given SWA, is dependent on vehicle speed. Thus, in the graph illustrated in FIG. 4, there is provided a representation of SS in the y-axis, plotted against vehicle speed in the x-axis. As shown, increasing vehicle speeds typically result in increasing SS. As noted above, due to chassis wear, for example, over time the vehicle may become less responsive to steering inputs. Thus, the measured SS plot line in FIG. 4 is shallower (i.e., less responsive to SWA) as compared with the target SS plot line, which is based on the initial vehicle design considerations.

Figure 4:
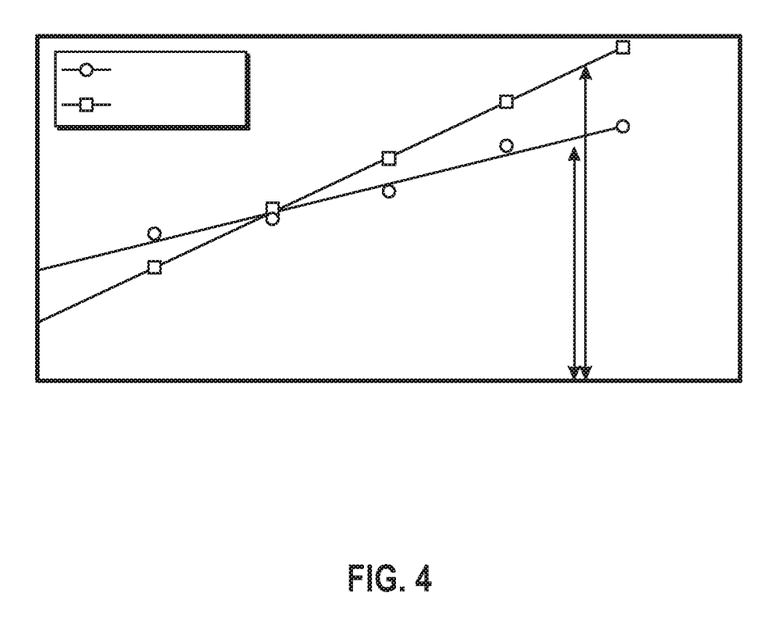
FIG. 4 illustrates a graph comparing measured steering responses with target steering responses for a range of vehicle speeds.

The measured data of FIG. 4, for example, as compared with the target data of FIG. 4, may serve as the basis for the corrected control signal 209 to be sent to the steering motor 76 for changing the wheel angle. Similarly, the measured and target data may serve as the basis for the control table of the feedforward controller 202. Thus, in a feedforward manner, without recourse to the actual lateral acceleration encountered with regard to a given vehicle speed and SWA, the data obtained as discussed with regard to FIGS. 3A and 3B may be used to correct the output 209 for a given SWA and vehicle speed, and across a range of SWAs and vehicle speeds. As such, the described systems and methods selectively vary a steering ratio to a degree that is determined in part by the speed of the vehicle, and in part by the control table, in order to optimize the steering response, according to initial vehicle design parameters. In this manner, the vehicle driver does not experience any diminution in steering response, and the actual output lateral acceleration 210 is as expected (desired), even as the vehicle chassis may wear over time and use.

It should be understood with regard to flowcharts that are referenced herein that division of the illustrated method into discrete operations as represented by blocks of the flowchart has been selected for convenience and clarity only. Alternative division of the illustrated method into operations represented blocks is possible, with equivalent results. Any such alternative division into of the illustrated method into discrete operations should be understood as included within the scope of embodiments of the present disclosure.

It should also be understood with regard to flowcharts that are referenced herein that, unless indicated otherwise, the order of operations of the illustrated method as represented by ordering of blocks of the flowchart has been selected for convenience and clarity only. Operations of the illustrated method may be executed in a different order, or concurrently, with equivalent results. Any such alternative ordering of operations as represented by blocks should be understood as included within the scope of embodiments of the disclosure.

Embodiments of the present disclosure may include apparatus for performing the operations described herein. Such apparatus may be specially constructed for the desired purposes, or may include computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the disclosure as described herein. Embodiments of the disclosure may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Accordingly, the present disclosure has provided embodiments of systems and methods for real-time steering response compensation in vehicles. The disclosed embodiments provide systems and methods for real-time steering response compensation in vehicles, such that even as vehicle chassis components wear over time, the driver does not realize any appreciable diminution in steering performance and responsiveness.

While at least one exemplary steering response compensation system and method has been presented in the foregoing detailed description, it should be appreciated that a vast number of variations exist. It should also be appreciated that the exemplary steering response compensation system and method or exemplary steering response compensation systems and methods are only examples, and are not intended to limit the scope, applicability, or configuration of the disclosure in any way. Rather, the foregoing detailed description will provide those skilled in the art with a convenient road map for implementing an exemplary steering response compensation system and method of the disclosure. It is understood that various changes may be made in the function and arrangement of elements described in an exemplary steering response compensation system and method without departing from the scope of the disclosure as set forth in the appended claims.

What is claimed is:

1. An electronic control unit for a steer-by-wire vehicle steering system comprising:
   a data storage component that stores a desired lateral acceleration versus steering angle profile with regard to a range of vehicle speeds; and
   a processor operably and electronically coupled with a steering wheel angle sensor, a steering motor, and a yaw sensor,
   wherein the data storage component comprises electronic instructions that causes the processor to:
   receive steering wheel angle data over a range of vehicle speeds;
   receive vehicle yaw data over the range of vehicle speed correlated to the steering wheel angle data;
   generate an observed lateral acceleration versus steering angle profile with regard to the range of vehicle speeds;
   generate a steering ratio correction based on a comparison of the desired lateral acceleration versus steering angle profile and the observed lateral acceleration profile;
   after generating the steering ratio correction, receive an input from the steering wheel angle sensor corresponding to a commanded turn; and generate an output to the steering motor corresponding to the commanded turn corrected with the steering ratio correction.

2. The electronic control unit of claim 1, wherein the processor receives the steering wheel angle data from a steering wheel sensor or a rotary sensor operably coupled with the electronic control unit.

3. The electronic control unit of claim 1, wherein the processor receives vehicle yaw data from an inertial measurement unit operably coupled with the electronic control unit.

4. The electronic control unit of claim 1, wherein the processor is configured to generate the steering ratio correction in a feedforward manner.

5. The electronic control unit of claim 1, wherein the processor is configured to generate the steering ratio correction based on steering data segment analysis, wherein the data segment analysis is performed on an observed data segment over a predefined period of time.

6. The electronic control unit of claim 5, wherein the processor determines whether the observed data segment comprises data recorded at an average vehicle speed of less than a predefined average vehicle speed.

7. The electronic control unit of claim 5, wherein the processor determines whether the observed data segment comprises data recorded within am absolute speed range of less than a predefined absolute vehicle speed range.

8. The electronic control unit of claim 5, wherein the processor determines whether the observed data segment comprises data having a standard deviation of less than a predetermined standard deviation range.

9. The electronic control unit of claim 5, wherein the processor is further configured to apply a high-pass filter to the observed data segment.

10. The electronic control unit of claim 5, wherein the processor is further configured to correlate the observed yaw data and lateral acceleration profile.

11. The electronic control unit of claim 10, wherein the processor is further configured to calculate a homogeneity of the correlated observed yaw data and lateral acceleration profile.

12. The electronic control unit of claim 5, wherein the processor is further configured to calculate a lateral acceleration of the vehicle during the segment based on the yaw data and the range of vehicle speeds.

13. The electronic control unit of claim 1, wherein the processor is further configured to determine if a mean lateral acceleration of the vehicle during the segment is less than a predefined normal operating lateral acceleration.

14. A method for operating an electronic control unit of a steer-by-wire vehicle steering system, the method comprising the steps of:
using a data storage component, storing a desired lateral acceleration versus steering angle profile with regard to a range of vehicle speeds;
using a processor, receiving steering wheel angle data over a range of vehicle speeds;
using the processor, receiving vehicle yaw data over the range of vehicle speed correlated to the steering wheel angle data;
using the processor, generating an observed lateral acceleration versus steering angle profile with regard to the range of vehicle speeds;
using the processor, generating a steering ratio correction based on a comparison of the desired lateral acceleration profile and the observed lateral acceleration profile;
using the processor, after generating the steering ratio correction, receiving an input corresponding to a commanded turn; and
using the processor, generating an output corresponding to the commanded turn corrected with the steering ratio correction.

15. The method of claim 14, wherein generating the steering ratio correction is performed in a feedforward manner.

16. The method of claim 15, further comprising generating the steering ratio correction based on steering data segment analysis, wherein the data segment analysis is performed on an observed data segment over a predefined period of time.

17. The method of claim 15, further comprising determining whether the observed data segment comprises data recorded at an average vehicle speed of less than a predefined average vehicle speed.

18. The method of claim 15, further comprising determining whether the observed data segment comprises data recorded within am absolute speed range of less than a predefined absolute vehicle speed range.

19. The method of claim 15, further comprising determining whether the observed data segment comprises data having a standard deviation of less than a predetermined standard deviation range.

20. A vehicle comprising:
a plurality of wheels; and
a steer-by-wire steering system operably coupled with the plurality of wheels,
wherein the steer-by-wire system comprises an electronic control unit, and wherein the electronic control unit comprises:
a data storage component that stores a desired lateral acceleration profile with regard to a range of vehicle speeds; and
a processor operably and electronically coupled with a steering wheel angle sensor, a steering motor, and a yaw sensor,
wherein the data storage component comprises electronic instructions that causes the processor to:
receive steering wheel angle data over a range of vehicle speeds;
receive vehicle yaw data over the range of vehicle speed correlated to the steering wheel angle data;
generate an observed lateral acceleration versus steering angle profile with regard to the range of vehicle speeds;
generate a steering ratio correction based on a comparison of the desired lateral acceleration versus steering angle profile and the observed lateral acceleration profile;
after generating the steering ratio correction, receive an input from the steering wheel angle sensor corresponding to a commanded turn; and
generate an output to the steering motor corresponding to the commanded turn corrected with the steering ratio correction.

* * * * *